(12) United States Patent
Ganesan et al.

(10) Patent No.: US 12,445,189 B2
(45) Date of Patent: Oct. 14, 2025

(54) SIDELINK FAILURE DETECTION AND RECOVERY

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Joachim Loehr, Wiesbaden (DE); Alexander Johann Maria Golitschek Edler von Elbwart, Darmstadt (DE); Ravi Kuchibhotla, Chicago, IL (US); Vijay Nangia, Woodridge, IL (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 415 days.

(21) Appl. No.: 17/858,814

(22) Filed: Jul. 6, 2022

(65) Prior Publication Data

US 2022/0346175 A1 Oct. 27, 2022

Related U.S. Application Data

(63) Continuation of application No. 16/780,179, filed on Feb. 3, 2020, now Pat. No. 11,425,775.

(60) Provisional application No. 62/800,031, filed on Feb. 1, 2019.

(51) Int. Cl.
*H04B 7/06* (2006.01)
*H04W 76/14* (2018.01)
*H04W 76/19* (2018.01)

(52) U.S. Cl.
CPC ........ *H04B 7/06966* (2023.05); *H04W 76/14* (2018.02); *H04W 76/19* (2018.02)

(58) Field of Classification Search
CPC ...... H04W 76/19; H04W 76/14; H04B 7/088; H04B 7/0632; H04B 7/0695
See application file for complete search history.

(56) References Cited

U.S. PATENT DOCUMENTS

| | | | |
|---|---|---|---|
| 2017/0111754 A1* | 4/2017 | Baghel | H04W 76/27 |
| 2018/0227899 A1 | 8/2018 | Yu et al. | |
| 2019/0053314 A1 | 2/2019 | Zhou et al. | |
| 2019/0081691 A1 | 3/2019 | Nagaraja et al. | |

(Continued)

OTHER PUBLICATIONS

M. H. C. Garcia et al., "A Tutorial on 5G NR V2X Communications," in IEEE Communications Surveys & Tutorials, vol. 23, No. 3, third quarter 2021, pp. 1972-2026, Jul. 2021 (Year: 2021).*

(Continued)

*Primary Examiner* — Justin T Van Roie
(74) *Attorney, Agent, or Firm* — Kunzler Bean & Adamson

(57) ABSTRACT

Apparatuses, methods, and systems are disclosed for sidelink failure detection and recovery. One method includes receiving information indicating a sidelink failure detection resource set corresponding to at least one configured sidelink bandwidth part. The method includes determining a radio link quality of the at least one configured sidelink (Continued)

bandwidth part based on the sidelink failure detection resource set. The method includes detecting a sidelink failure based on the radio link quality. The method includes initiating a sidelink failure recovery procedure based on the sidelink failure.

15 Claims, 11 Drawing Sheets

(56) References Cited

U.S. PATENT DOCUMENTS

| | | | |
|---|---|---|---|
| 2019/0319833 A1 | 10/2019 | Nagaraja et al. | |
| 2021/0410084 A1* | 12/2021 | Li | H04W 52/265 |
| 2023/0189370 A1* | 6/2023 | Park | H04L 1/1854 |
| | | | 370/329 |

OTHER PUBLICATIONS

EGPP, "3rd Generation Partnership Project; Technical Specification Group Radio Access Network; NR; Medium Access Control (MAC) protocol specification (Release 15)", 3GPP TS 38.321 V15.4.0, Dec. 2018, p. 1-77.

3GPP, "3rd Generation Partnership Project; Technical Specification Group Radio Access Network; NR; Physical layer procedures for control (Release 15)", 3GPP TS 38.213 V15.4.0, Dec. 2018, pp. 1-104.

3GPP, "3rd Generation Partnership Project; Technical Specification Group Radio Access Network; NR; Study on Vehicle-to-Everything (Release 16)", 3GPP TR 38.885 V1.0.0, Nov. 2018, pp. 1-23.

AT&T, "Beam Failure Recovery Mechanism and RLF", 3GPP TSG-RAN WG2 NR-Adhoc R2-1706680, Jun. 27-29, 2017, pp. 1-7.

Huawei, Hisilicon, "Beamforming for V2X sidelink for FR1 and FR2", 3GPP TSG RAN WG1 Ad-Hoc Meeting 1901 R1-1900862, Jan. 21-25, 2019, pp. 1-5.

Spreadtrum Communications, "Considerations on beam-based transmission for Sidelink", 3GPP TSG RAN WG1 Meeting #94bis R1-1811003, Oct. 8-12, 2018, pp. 1-2.

Interdigital Inc., "Physical Layer Procedures for NR V2X Sidelink", 3GPP TSG RAN WG1 Ad-Hoc Meeting 1901 R1-1900794, Jan. 21-25, 2019, pp. 1-10.

M. Giordani et al., "A Tutorial on Beam Management for 3GPP NR at mmWave Frequencies" arXiv: 1804.01908v1 [cs.NI], Apr. 5, 2018, pp. 1-22.

NTT DOCOMO, Inc., "Requirements for beam failure detection based on SSB and CSI-RS", 3GPP TSG RAN WG4 Meeting #87 R4-1806392, May 21-25, 2018, pp. 1-8.

* cited by examiner

SIDELINK FAILURE DETECTION AND RECOVERY

CROSS-REFERENCE TO RELATED APPLICATIONS

This application is a continuation application of U.S. patent application Ser. No. 16/780,179 filed on Feb. 3, 2020, which claims priority to U.S. Patent Application Ser. No. 62/800,031 entitled "PROCEDURES FOR FAST SIDELINK LINK AND BEAM RECOVERY" and filed on Feb. 1, 2019 for Karthikeyan Ganesan, all of which are incorporated herein by reference in their entirety.

FIELD

The subject matter disclosed herein relates generally to wireless communications and more particularly relates to sidelink failure detection and recovery.

BACKGROUND

The following abbreviations are herewith defined, at least some of which are referred to within the following description: Third Generation Partnership Project ("3GPP"), 5$^{th}$ Generation ("5G"), Positive-Acknowledgment ("ACK"), Aggregation Level ("AL"), Access and Mobility Management Function ("AMF"), Access Point ("AP"), Access Stratum ("AS"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Contention-Based Random Access ("CBRA"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CS S"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1-sub 6 GHz frequency bands and/or 410 MHz to 7125 MHz ("FR1"), Frequency Range 2-24.25 GHz to 52.6 GHz ("FR2"), 5G Node B or Next Generation Node B ("gNB"), Global Navigation Satellite System ("GNSS"), General Packet Radio Services ("GPRS"), Guard Period ("GP"), Global Positioning System ("GPS"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 1 ("L1"), Layer 2 ("L2"), Layer 3 ("L3"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MIME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), NR Unlicensed ("NR-U"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Primary Cell ("PCell"), Policy Control Function ("PCF"), Physical Cell ID ("PCID"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Sidelink Control Channel ("PSCCH"), Primary Secondary Cell ("PSCell"), Physical Sidelink Feedback Channel ("PSFCH"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Radio Access Technology ("RAT"), Random Access Procedure ("RACH"), Random Access Preamble Identifier ("RAPID"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sub-carrier Spacing ("SCS"), Service Data Unit ("SDU"), Serving Gateway ("SGW"), System Information Block ("SIB"), SystemInformationBlockType1 ("SIB1"), SystemInformationBlockType2 ("SIB2"), Sub scriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TTI ("sTTI"), Synchronization Signal ("SS"), Sidelink SSB ("S-SSB"), Synchronization Signal Block ("SSB"), Supplementary Uplink ("SUL"), Subscriber Permanent Identifier ("SUPI"), Timing Advance ("TA"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), UL SCH ("UL-SCH"), Universal Mobile Telecommunications System ("UNITS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Visiting AMF ("vAMF"), Visiting NSSF ("vNSSF"), Visiting PLMN ("VPLMN"), and Worldwide Interoperability for Microwave Access ("WiMAX").

In certain wireless communications networks, sidelink failures may occur.

BRIEF SUMMARY

Methods for sidelink failure detection and recovery are disclosed. Apparatuses and systems also perform the functions of the methods. One embodiment of a method includes receiving information indicating a sidelink failure detection resource set corresponding to at least one configured sidelink bandwidth part. In some embodiments, the method includes determining a radio link quality of the at least one configured sidelink bandwidth part based on the sidelink failure detection resource set. In certain embodiments, the method includes detecting a sidelink failure based on the radio link quality. In various embodiments, the method includes initiating a sidelink failure recovery procedure based on the sidelink failure.

One apparatus for sidelink failure detection and recovery includes a receiver that receives information indicating a sidelink failure detection resource set corresponding to at least one configured sidelink bandwidth part. In certain embodiments, the apparatus includes a processor that: determines a radio link quality of the at least one configured sidelink bandwidth part based on the sidelink failure detection resource set; detects a sidelink failure based on the radio link quality; and initiates a sidelink failure recovery procedure based on the sidelink failure.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
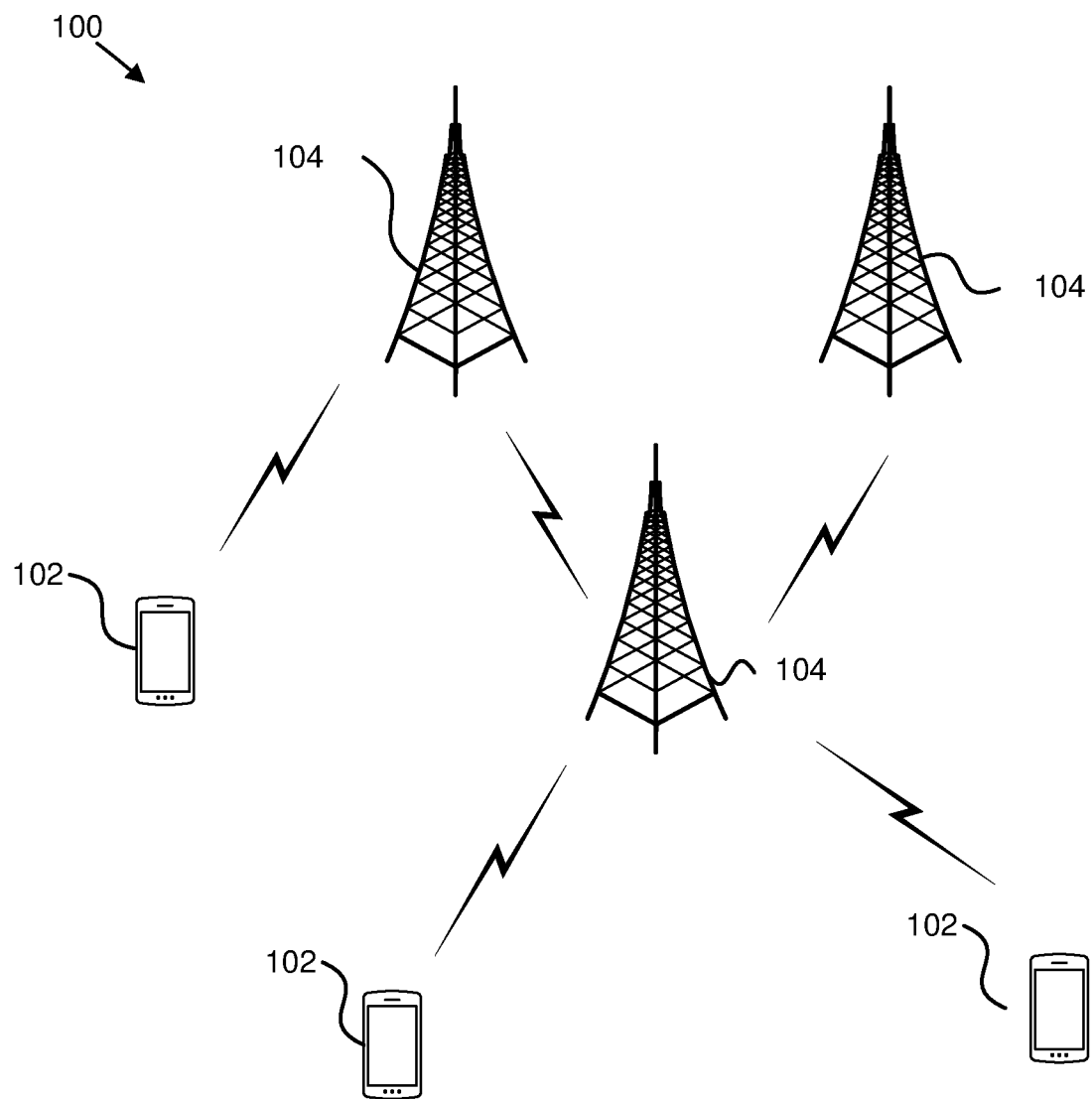
FIG. 1 is a schematic block diagram illustrating one embodiment of a wireless communication system for sidelink failure detection and recovery.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sidelink failure detection and recovery. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive information indicating a sidelink failure detection resource set corresponding to at least one configured sidelink bandwidth part. In some embodiments, the remote unit 102 may determine a radio link quality of the at least one configured sidelink bandwidth part based on the sidelink failure detection resource set. In certain embodiments, the remote unit 102 may detect a sidelink failure based on the radio link quality. In various embodiments, the remote unit 102 may initiate a sidelink failure recovery procedure based on the sidelink failure. Accordingly, the remote unit 102 may be used for sidelink failure detection and recovery.

Figure 2:
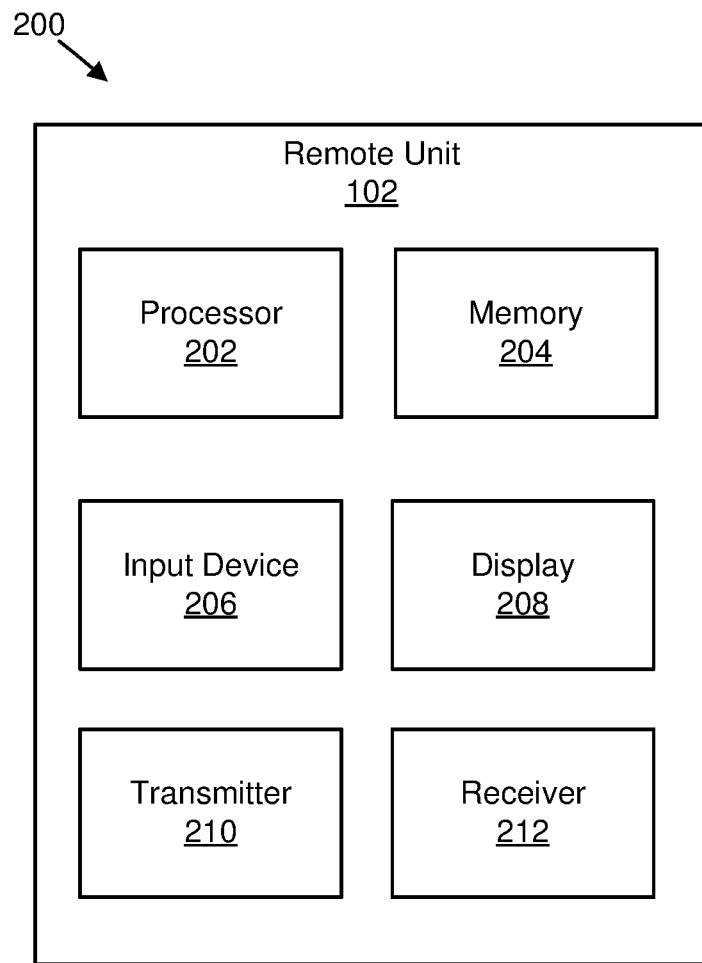
FIG. 2 is a schematic block diagram illustrating one embodiment of an apparatus that may be used for sidelink failure detection and recovery.

FIG. 2 depicts one embodiment of an apparatus 200 that may be used for sidelink failure detection and recovery. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a radio link quality of at least one configured sidelink bandwidth part based on a sidelink failure detection resource set; detect a sidelink failure based on the radio link quality; and initiate a sidelink failure recovery procedure based on the sidelink failure. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein.

In some embodiments, the receiver 212 may receive information indicating a sidelink failure detection resource set corresponding to at least one configured sidelink bandwidth part. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
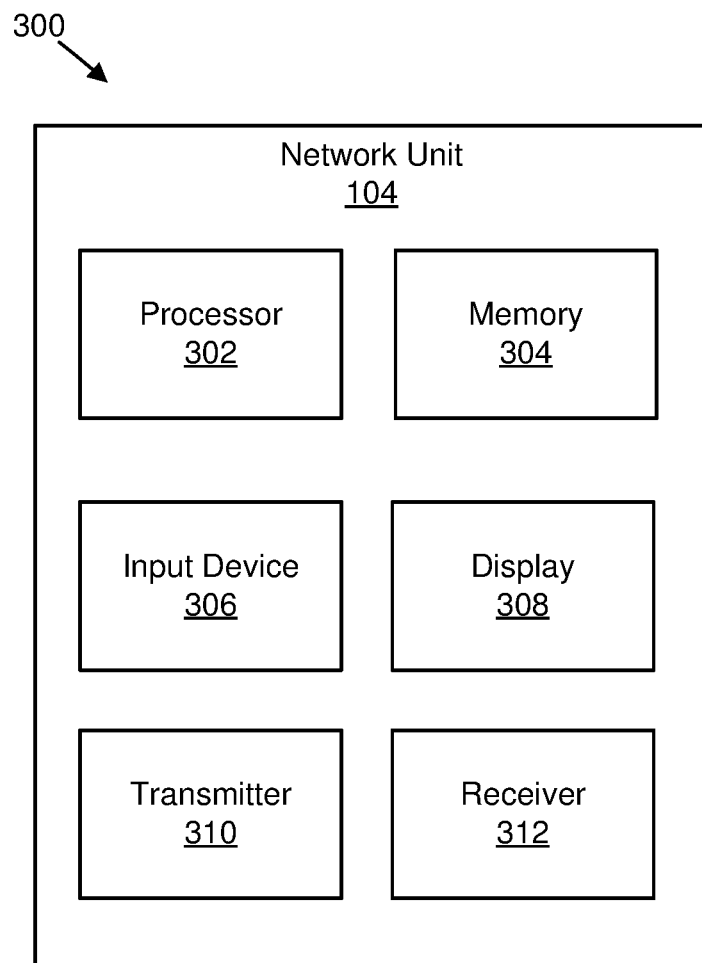
FIG. 3 is a schematic block diagram illustrating one embodiment of an apparatus that may be used for transmitting information.

FIG. 3 depicts one embodiment of an apparatus 300 that may be used for transmitting information. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 may transmit information. Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain configurations, a link and/or beam pair links of a sidelink non-beamformed and/or beamformed transmissions for unicast data might experience a radio link or beam failure due to blockages or mobility.

Figure 4:
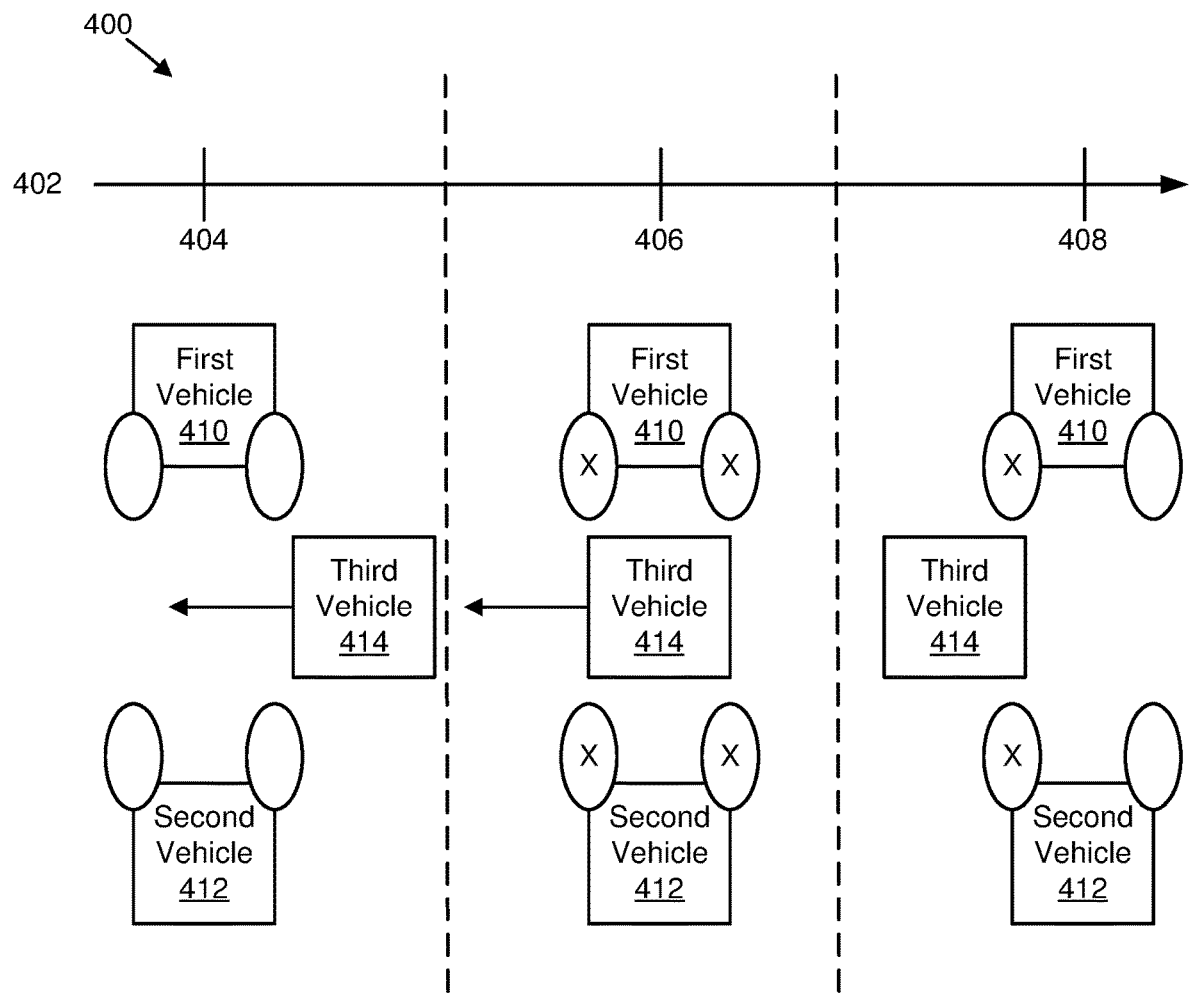
FIG. 4 is a diagram illustrating one embodiment of a sidelink unicast link blockage.

FIG. 4 is a diagram 400 illustrating one embodiment of a sidelink unicast link blockage. The diagram 400 is illustrated over a time period 402 that includes a first time 404, a second time 406, and a third time 408. At the first time 404, a first vehicle 410 and a second vehicle 412 communicate with one another while a third vehicle 414 begins to travel toward a space between the first vehicle 410 and the second vehicle 412 without interfering with the communication between the first vehicle 410 and the second vehicle 412. At the second time 406, the third vehicle 414 causes complete interference (e.g., beam blockage) with the communication between the first vehicle 410 and the second vehicle 412 thereby interrupting unicast transmission. At the third time 408, the third vehicle 414 causes partial interference with the communication between the first vehicle 410 and the second vehicle 412.

As may be appreciated, in the embodiment illustrated in FIG. 4, the vehicles may be synchronized with GPS and/or GNSS, the vehicles may be synchronized with LTE SLSS or NR FR1 SLSS, and/or the vehicles may only be synchronized with NR FR2 SLSS.

In certain configurations, a UE monitors a downlink radio link quality by indicating an in-sync indication and/or an out-of-sync indication to higher layers for a configured (e.g., active) BWP. In such configurations, the UE performs radio link monitoring either with a SS/PBCH block if a DL BWP is an initial BWP of the UE or, if the UE is configured with a set of resource indexes that are either SSB or CSI-RS indices, through a corresponding set of higher layer parameters (e.g., RadioLinkMonitoringRS) for radio link monitoring by higher layer parameters (e.g., failureDetectionResources).

In some embodiments, a MAC entity may be configured by RRC with a beam failure recovery procedure that is used for indicating to a serving gNB of a new SSB or CSI-RS if beam failure is detected on serving SSB(s)/CSI-RS(s).

Figure 5:
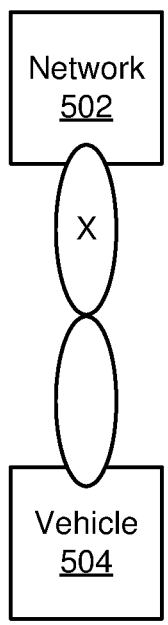
FIG. 5 is a diagram illustrating one embodiment of downlink beam loss.

FIG. 5 is a diagram 500 illustrating one embodiment of downlink beam loss. The diagram 500 includes a network 502 and a vehicle 504 in which there is downlink beam loss.

Figure 6:
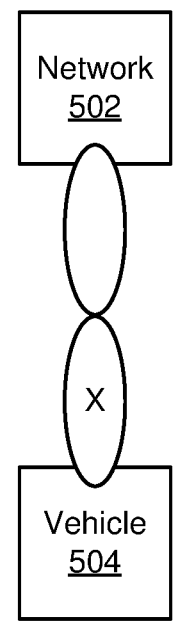
FIG. 6 is a diagram illustrating one embodiment of uplink beam loss.

FIG. 6 is a diagram 600 illustrating one embodiment of uplink beam loss. The diagram 600 includes the network 502 and the vehicle 504 in which there is uplink beam loss.

In certain embodiments, if there is UL and DL beam loss of a primary cell as shown in FIG. 4, a beam failure indication may be received by a MAC layer and compared with a configured maximum value.

In various embodiments, there may be at least the following two SL resource allocation modes: Mode 1: a BS schedules SL resources to be used by a UE for SL transmissions; and Mode 2: the UE determines (e.g., the BS does not schedule) SL transmission resources within SL resources configured by the BS and/or network or there are pre-configured SL resources. The definition of SL resource allocation Mode 2 may cover: a) the UE autonomously selects SL resource for transmission; b) the UE assists SL resource selection for other UEs; c) the UE is configured with an NR configured grant (Type-1 like) for SL transmission; and/or d) the UE schedules SL transmissions of other UEs.

In some embodiments, a sidelink radio link monitoring procedure includes configuring SL-radiolinkmonitoringRS and SL-failureDetectionRS for unicast data transmission between a TX UE and an RX UE. The configuration may be provided as part of an AS level information exchange between the TX UE and the RX UE via an NR PC5 RRC message exchange. If the TX UE is a synchronization reference UE then an SSB transmission may be used for RLM measurements.

Figure 7:
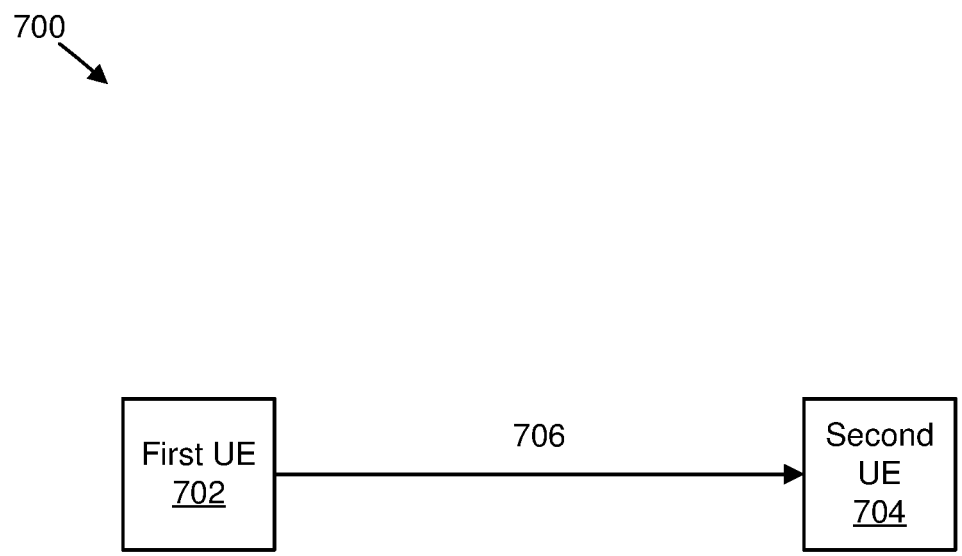
FIG. 7 is a communication diagram illustrating one embodiment of sidelink communications.

FIG. 7 is a communication diagram illustrating one embodiment of sidelink communications 700 between a first UE 702 (e.g., TX UE, car A) and a second UE 704 (e.g., RX UE, car B). As may be appreciated, communications that are part of the sidelink communications 700 may each include one or more messages. The sidelink communications 700 include a first communication 706 transmitted from the first UE 702 to the second UE 704 in which the first UE 702 transmits information for a NR PC5 RRC configuration (e.g., SL-radiolinkmonitoringRS, SL-failureDetectionRS, SL-BeamFailureRecoveryConfig) to the second UE 704.

In certain embodiments, a sidelink radio link and/or beam recovery procedure for a unicast data link may be used for V2V communication within an access stratum. As used herein, a sidelink radio link and/or beam recovery procedure for unicast transmission may consider both FR1 and FR2. As may be appreciated, various embodiments described herein may be applicable to link management of groupcast transmissions.

In various embodiments, if a beam failure occurs for one or more active BWPs belonging to the same or different carriers, a single sidelink beam failure recovery may be triggered. The sidelink beam failure recovery may include transmitting a message that indicates a BWP ID corresponding to the beam failure of the one or more active BWPs.

In some embodiments, if a UE maintains one or more unicast or groupcast AS level links with one or more UEs in its vicinity, one or more beam failure recovery messages may be triggered by the UE. The one or more beam failure recovery messages may contain destination IDs of different unicast and/or groupcast links, BWP IDs, a candidate beam list, and/or other parameters. As may be appreciated, embodiments described herein for sidelink beam failure may also be applied to sidelink radio link failure.

In a first embodiment, there may be a UE SL MAC procedure enhancement for a sidelink link recovery message (e.g., that also includes SL-Beam failure recovery) to recover the sidelink unicast link or beam. In such an embodiment, SL-BeamFailureRecoveryConfig for SL-unicast data transmission may contain possible candidate SL beam configuration information like CSI-RS scheduling information, source and/or destination IDs, BWP IDs, panel id(s), and/or various ways to transmit the sidelink link recovery message.

Figure 8:
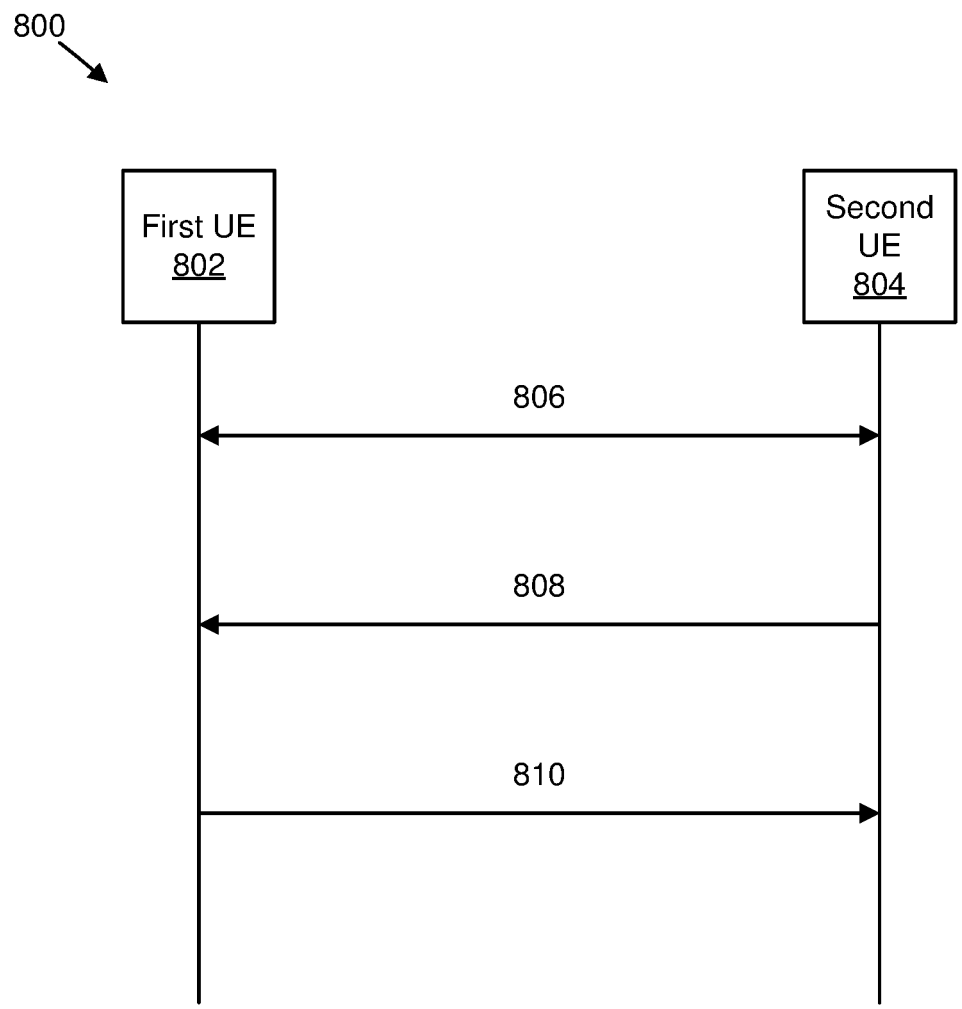
FIG. 8 is a communication diagram illustrating another embodiment of sidelink communications.

FIG. 8 is a communication diagram illustrating another embodiment of sidelink communications 800. As may be appreciated, communications that are part of the sidelink communications 800 may each include one or more messages. The sidelink communications 800 illustrated are between a first UE 802 (e.g., TX UE) and a second UE 804 (e.g., RX UE).

In a first communication 806 transmitted between the first UE 802 and the second UE 804, unicast data transmissions are made between the first UE 802 and the second UE 804.

In a second communication 808 transmitted from the second UE 804 to the first UE 802, the second UE 804 transmits a sidelink L1 indication used to report a link loss or a beam loss to the first UE 802. The sidelink L1 indication may be similar to a SR and/or RACH transmission or it may be a PSCCH or PSFCH based transmission. Moreover, the sidelink L1 indication may be a groupcast or broadcast message such that it includes a UE ID and a notification message informing other UEs about the failure. In some embodiments, such as for in-coverage embodiments, either the first UE 802 or the second UE 804 may request resources from an eNB/gNB for transmitting the SL L1 indication of the radio link loss or beam failure message while, for out-of-coverage embodiments, the resources may be pre-configured or provided by a scheduling UE. As used herein, in-coverage may mean that a sidelink UE is inside of coverage of a gNB and/or eNB which may mean that it receives signals or messages from the gNB and/or eNB. Moreover, as used herein, out-of-coverage may mean that a sidelink UE is out of coverage of the gNB and/or eNB which may mean that it does not receive any signal or message from the gNB and/or eNB.

After the first UE 802 detects the radio link or beam link failure message from the second UE 804, in a third communication 810 transmitted from the first UE 802 to the second UE 804, the first UE 802 transmits a SL recovery message (e.g., SL BFR message). The SL recovery message may include a candidate beam information list in L1, L2, and/or L3 signaling that contains information about UE IDs (e.g., source and destination IDs) or unicast link ID that uniquely identifies source-destination ID pairs, SL BWP IDs, and/or CSI RS scheduling information (e.g., time slot, periodicity, etc.). The SL BFR message may be a groupcast or broadcast transmission sent over the same sidelink carrier on which the radio link is lost or any other configured active sidelink carrier that has better coverage, where, in one example, the sidelink recovery message for sidelink FR2 (e.g., mmwave frequencies) may be transmitted using lower frequencies like NR FR1 and, in another example, the sidelink recovery message may be transmitted using another sidelink RAT such as LTE SL.

The third communication 810 may be transmitted using L1, L2, and/or L3 signaling using one or more of the following: in one example, PSCCH may be used to transmit the sidelink recovery message in a groupcast transmission using either lower frequencies like FR1 or another RAT like LTE SL; in a second example, discovery message may be initiated to transmit the sidelink recovery message where the discovery message may be transmitted via L1 or higher layer signaling; in a third example, SL MAC CE may be used to transmit the sidelink recovery message in a groupcast transmission using either lower frequencies like FR1 or another RAT like LTE SL; in a fourth example, PDCP control information may be used to transmit the sidelink recovery message and may be transmitted either using a different low frequency carrier or a different SL RAT; in a fifth example, the sidelink recovery message for FR2 may be transmitted using the same FR2 carrier; in a sixth example, the group or broadcast transmission comprises partial or full beam sweeping with different distributed antenna panels; and/or in another example, a combination of one or more above examples may be used to transmit SL recovery message.

In some embodiments, if there is a beamformed transmission (e.g., NR FR2 is enabled), a link recovery and/or beam recovery request containing candidate beam information is sent over SL MAC CE, PSCCH, and/or discovery message in a groupcast or broadcast transmission and partial or full beam sweeping with repetition. In certain embodiments, a partial or full beam sweeping configuration may include a time slot, and/or a periodicity of repetition of a SL link recovery message. The beam recovery request message may be preconfigured as part of SL-BeamFailureRecoveryConfig.

For in-coverage embodiments, either the first UE 802 or the second UE 804 may request resources from an eNB/gNB for transmitting a SL beam failure request message, while for out-of-coverage embodiments, the resources may be preconfigured, autonomously selected by the UE, or provided by a scheduling UE.

Figure 9:
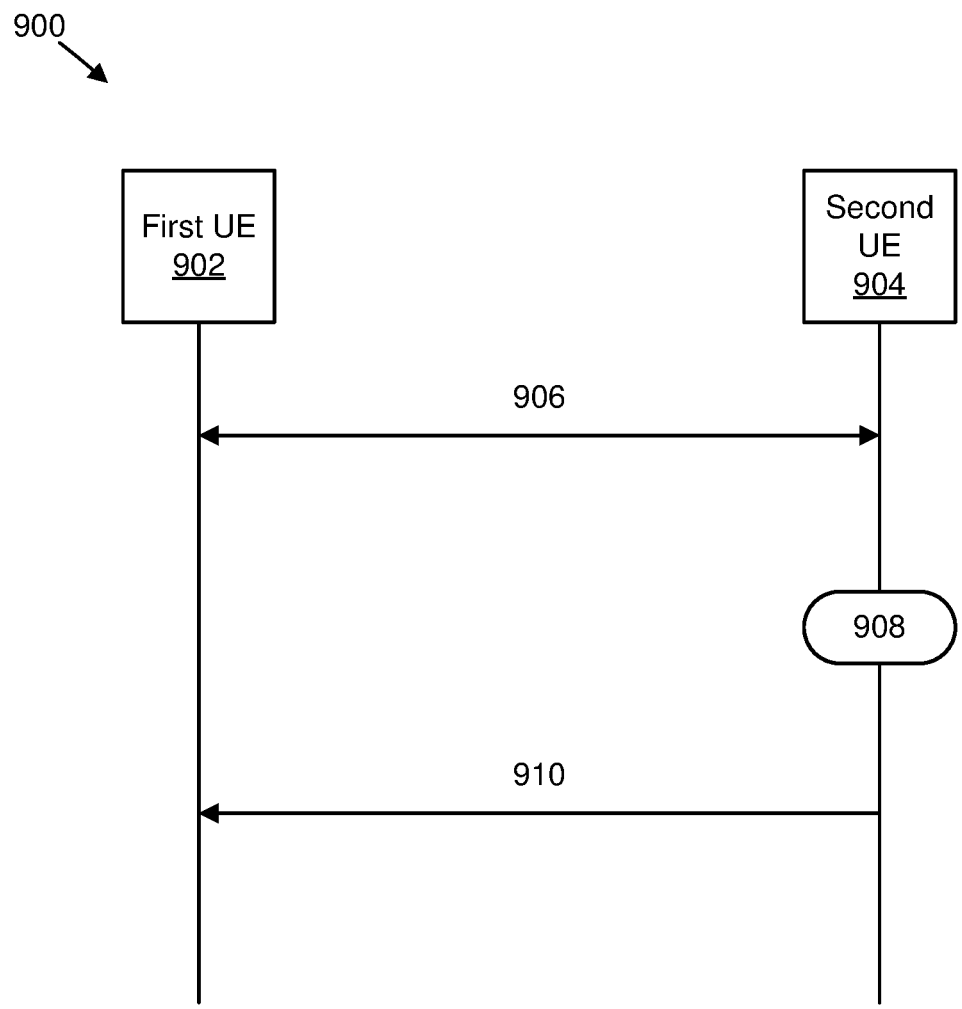
FIG. 9 is a communication diagram illustrating a further embodiment of sidelink communications.

FIG. 9 is a communication diagram illustrating a further embodiment of sidelink communications 900. As may be appreciated, communications that are part of the sidelink communications 900 may each include one or more messages. The sidelink communications 900 illustrated are between a first UE 902 (e.g., TX UE) and a second UE 904 (e.g., RX UE).

In a first communication 906 transmitted between the first UE 902 and the second UE 904, unicast data transmissions are made between the first UE 902 and the second UE 904.

The second UE 904 determines 908 that there is a radio link loss or a beam loss.

In a second communication 910 transmitted from the second UE 904 to the first UE 902, the second UE 904 initiates the transmission of a SL recovery message that may be substantially similar to the SL recovery message described in relation to FIG. 8. As may be appreciated, in other embodiments, the first UE 902 may determine that there is a radio link loss or a beam loss, and the first UE 902 may transmit a SL recovery message to the second UE 904.

As may be appreciated, FIGS. 8 and 9 describe embodiments in which UEs (e.g., cars, vehicles) are synchronized with GNSS or SLSS in another carrier (e.g., LTE SL or NR FR1 SL), and the radio link loss or beam loss happened in NR FR2.

Figure 10:
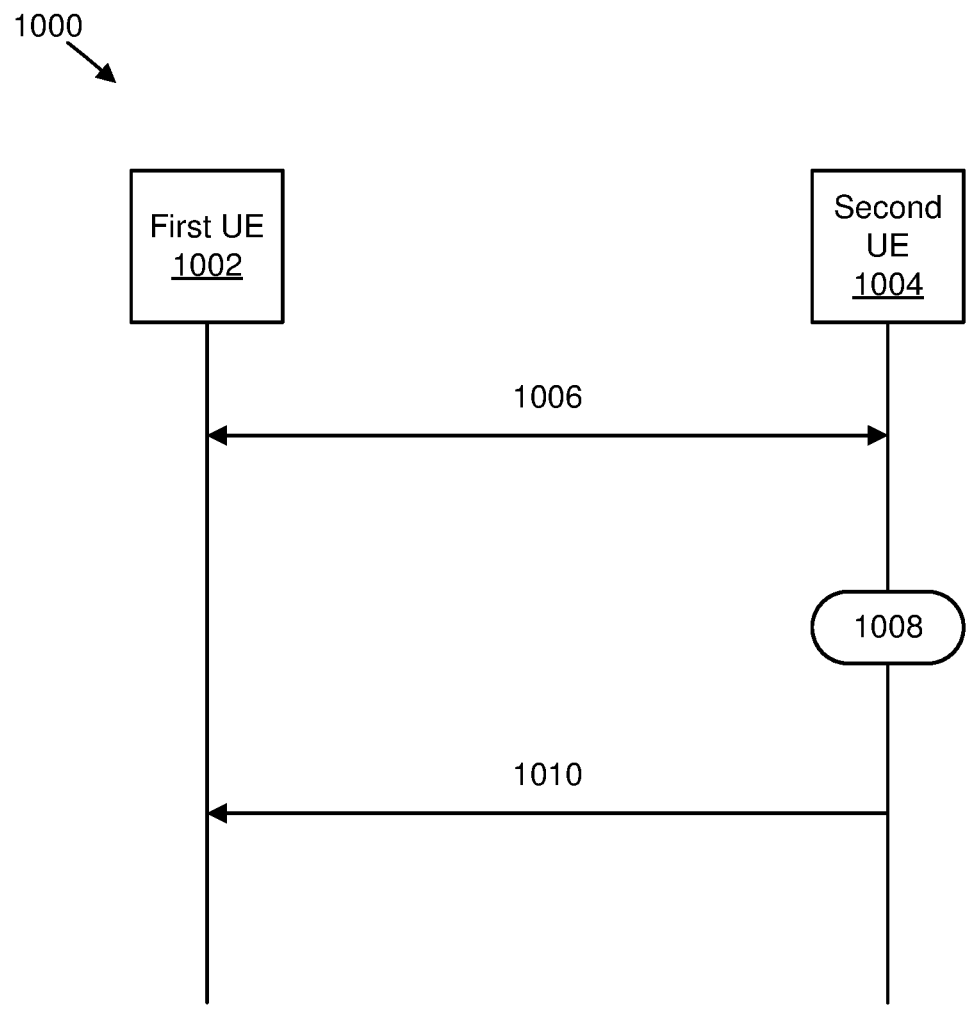
FIG. 10 is a communication diagram illustrating yet another embodiment of sidelink communications.

FIG. 10 illustrates one embodiment in which SLSS is being transmitted or received on the same carrier or BWP as that of data and if radio link or beam failure happens.

FIG. 10 is a communication diagram illustrating yet another embodiment of sidelink communications 1000. As may be appreciated, communications that are part of the sidelink communications 1000 may each include one or more messages. The sidelink communications 1000 illustrated are between a first UE 1002 (e.g., TX UE) and a second UE 1004 (e.g., RX UE).

In a first communication 1006 transmitted between the first UE 1002 and the second UE 1004, unicast data transmissions are made between the first UE 1002 and the second UE 1004.

The second UE 1004 determines 1008 that there is a radio link loss or a beam loss.

In a second communication 1010 transmitted from the second UE 1004 to the first UE 1002, the second UE 1004 initiates the transmission of SLSS or S-SSB in the same carrier or another carrier that may be configured with a partial beam sweeping pattern to enable quick recovery. As may be appreciated, in other embodiments, the first UE 1002 may determine that there is a radio link loss or a beam loss, and the first UE 1002 may initiate the transmission of SLSS or S-SSB. In another example, the second UE 1004 could also initiate the sidelink recovery message explained in the first embodiment.

Figure 11:
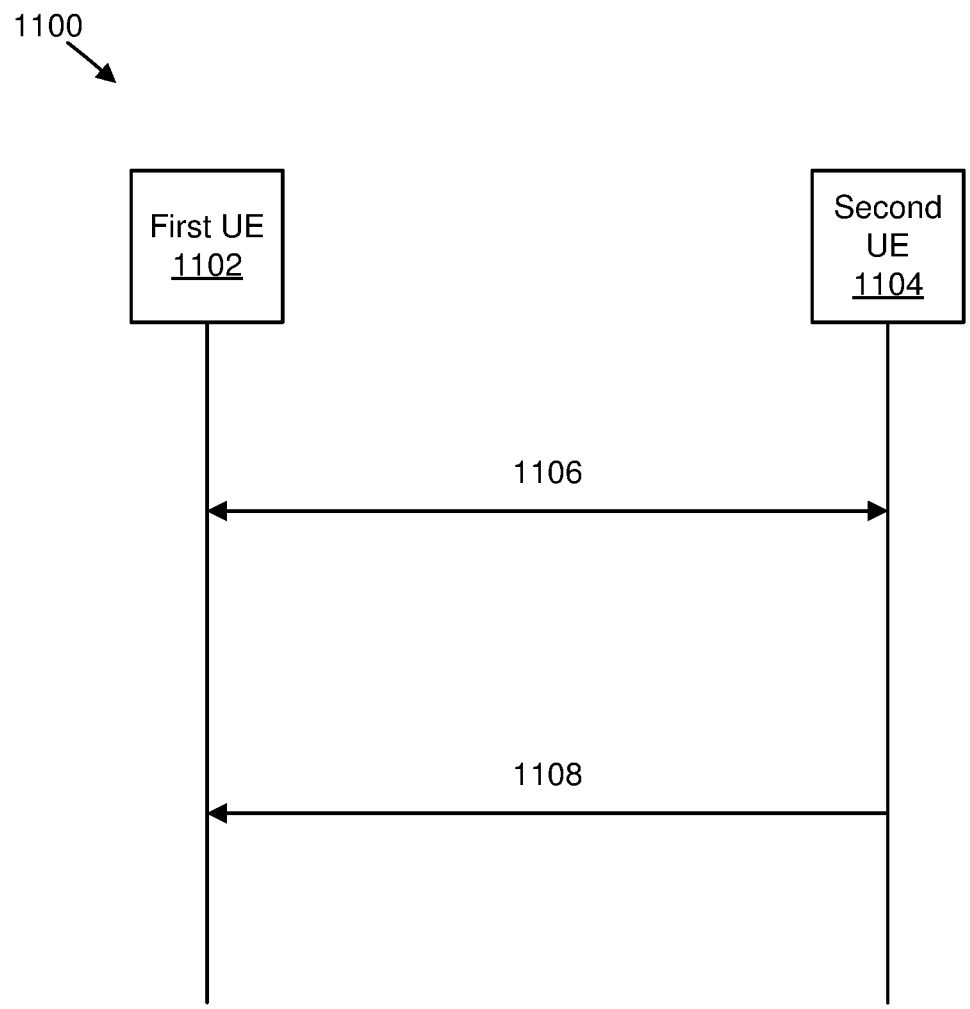
FIG. 11 is a communication diagram illustrating yet a further embodiment of sidelink communications.

FIG. 11 is a communication diagram illustrating yet a further embodiment of sidelink communications 1100. As may be appreciated, communications that are part of the sidelink communications 1100 may each include one or more messages. The sidelink communications 1100 illustrated are between a first UE 1102 (e.g., TX UE) and a second UE 1104 (e.g., RX UE).

In a first communication 1106 transmitted between the first UE 1102 and the second UE 1104, unicast data transmissions are made between the first UE 1102 and the second UE 1104.

In a second communication 1108 transmitted from the second UE 1104 to the first UE 1102, the second UE 1104 transmits a periodic update of a candidate beam information list based on received signal strengths. As may be appreciated, a periodic exchange of serving and/or candidate beam related information lists for measurement between the first UE 1102 and the second UE 1104 in PSFCH/PC5 RRC may facilitate a candidate list update in SL-beamFailureRecoveryConfig. In one example, as explained in the first embodiment, the periodic measurement report for FR2 (e.g., mmWave frequency) may be transmitted in the same carrier/BWP where the measurement was performed or in a different carrier/BWP where it has better coverage, such as FR1. A measurement report may contain information to associate the report with a particular unicast link ID that uniquely identifies source-destination ID pairs, SL BWP IDs, and may be transmitted in L1, L2, or L3 signaling.

In certain embodiments, the SL MAC entity may:
1> if the SL beam failure instance indication has been received from lower layers:
  2> start or restart the SL-beamFailureDetectionTimer;
  2> increment SL BFI COUNTER by 1;
  2> if BFI COUNTER>=SL-beamFailureInstanceMaxCount:
    3> if SL-beamFailureRecoveryConfig is configured for the active UL BWP:
      4> start the SL-beamFailureRecoveryTimer, if configured;
      4> initiate a SL beam failure recovery procedure on the active SL BWP by applying the parameters configured in the SL-beamFailureRecoveryConfig.
    3> else:
      4> initiate a SL Synchronization transmission (partial or full beam sweeping configuration)
1> if the SL-beamFailureDetectionTimer expires; or
1> if SL-beamFailureDetectionTimer, SL-beamFailureInstanceMaxCount, or any of the reference signals used for beam failure detection is reconfigured by upper layers:
  2> set SL BFI COUNTER to 0.
1> if the SL beam failure recovery procedure is successfully completed
  2> set BFI COUNTER to 0;
  2> stop the SL-beamFailureRecoveryTimer, if configured;
  2> consider the SL Beam Failure Recovery procedure successfully completed.

Figure 12:
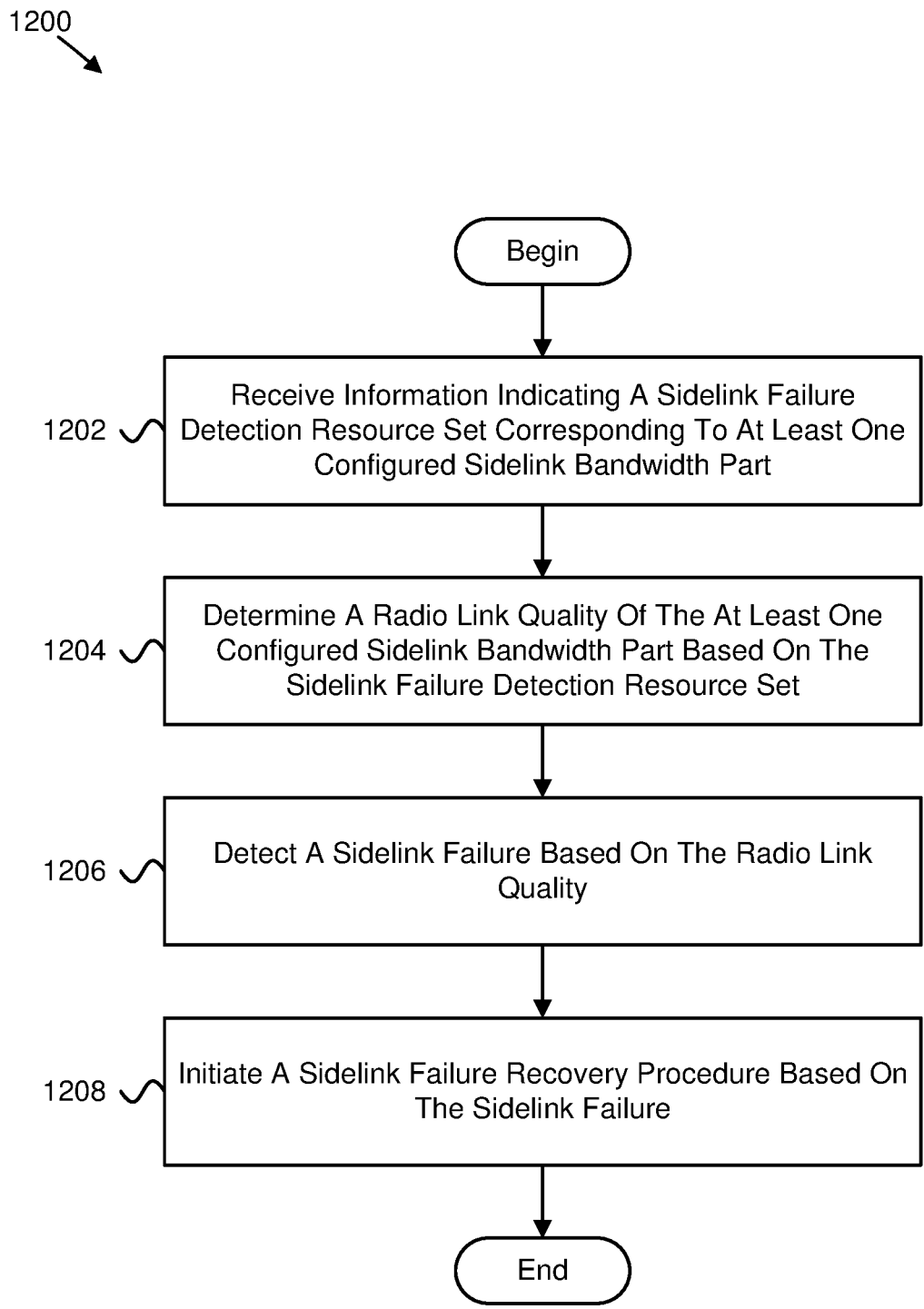
FIG. 12 is a flow chart diagram illustrating one embodiment of a method for sidelink failure detection and recovery.

FIG. 12 is a flow chart diagram illustrating one embodiment of a method 1200 for sidelink failure detection and recovery. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202 information indicating a sidelink failure detection resource set corresponding to at least one configured sidelink bandwidth part. In some embodiments, the method 1200 includes determining 1204 a radio link quality of the at least one configured sidelink bandwidth part based on the sidelink failure detection resource set. In certain embodiments, the method 1200 includes detecting 1206 a sidelink failure based on the radio link quality. In various embodiments, the method 1200 includes initiating 1208 a sidelink failure recovery procedure based on the sidelink failure.

In certain embodiments, the radio link quality indicates a radio link loss, a beam loss, or a combination thereof. In some embodiments, the information indicates a plurality of sidelink failure detection resource sets, and each sidelink failure detection resource set of the plurality of sidelink failure detection resource sets corresponds to a unicast session. In various embodiments, each sidelink failure detection resource set of the plurality of sidelink failure detection resources sets is for a corresponding configured sidelink bandwidth part of a plurality of configured sidelink bandwidth parts.

In one embodiment, the sidelink failure recovery procedure is initiated in response to a radio link quality being below a predetermined threshold for a predetermined number of instances. In certain embodiments, determining the radio link quality comprises receiving a hybrid automatic repeat request feedback. In some embodiments, detecting the sidelink failure based on the radio link quality comprises detecting the sidelink failure in response to the hybrid automatic repeat request feedback comprising a negative acknowledgment.

In various embodiments, initiating the sidelink failure recovery procedure comprises transmitting a sidelink failure report. In one embodiment, the sidelink failure report comprises information indicating a candidate reference signal for beam measurement, a candidate reference signal for link measurement, a candidate beam identifier, a candidate antenna panel identifier, or some combination thereof. In certain embodiments, a transmission parameter for transmitting the sidelink failure report is preconfigured or dynamically signaled.

In some embodiments, the transmission parameter is preconfigured via radio resource control signaling. In various embodiments, the transmission parameter is transmitted via layer 1 signaling, layer 2 signaling, or layer 3 signaling. In one embodiment, the transmission parameter indicates a groupcast transmission or a broadcast transmission.

In certain embodiments, the groupcast transmission or the broadcast transmission comprises a unicast link identifier that uniquely identifies a source-destination ID pair or a destination identifier. In some embodiments, the groupcast transmission or the broadcast transmission comprises beam sweeping with different distributed antenna panels, signaling sent in a carrier frequency or bandwidth part that has better coverage, a sidelink transmission, or some combination thereof. In various embodiments, transmitting the sidelink failure report comprises transmitting the sidelink failure report via a sidelink medium access control control element, a physical sidelink control channel, or a discovery message in which the discovery message transmission may be either in L1 or higher layer signaling.

In one embodiment, initiating the sidelink failure recovery procedure comprises receiving a sidelink failure report. In certain embodiments, initiating the sidelink failure recovery procedure comprises transmitting an indication of the sidelink failure, transmitting information for sidelink recovery, transmitting resynchronization information, not transmitting a reception acknowledgment, transmitting a non-acknowledgment, or some combination thereof. In some embodiments, the information for sidelink recovery comprises a candidate beam information list, a candidate reference signal, an antenna panel identifier, a destination identifier, a source identifier, a bandwidth part identifier, reference signal scheduling information, or some combination thereof.

In various embodiments, the method 1200 further comprises transmitting candidate beam related information for measurement at a predetermined time interval, wherein the measurement report is transmitted in the same carrier, the same BWP, a carrier having greater coverage, or a BWP having greater coverage. In one embodiment, the sidelink failure detection resource set is for detection of a sidelink radio link failure, a sidelink beam failure, or a combination thereof. In certain embodiments, the sidelink failure recovery procedure comprises a sidelink radio link failure recovery procedure, a sidelink beam failure recovery procedure, or a combination thereof.

In one embodiment, a method comprises: receiving information indicating a sidelink failure detection resource set corresponding to at least one configured sidelink bandwidth part; determining a radio link quality of the at least one configured sidelink bandwidth part based on the sidelink failure detection resource set; detecting a sidelink failure based on the radio link quality; and initiating a sidelink failure recovery procedure based on the sidelink failure.

In certain embodiments, the radio link quality indicates a radio link loss, a beam loss, or a combination thereof.

In some embodiments, the information indicates a plurality of sidelink failure detection resource sets, and each sidelink failure detection resource set of the plurality of sidelink failure detection resource sets corresponds to a unicast session.

In various embodiments, each sidelink failure detection resource set of the plurality of sidelink failure detection resources sets is for a corresponding configured sidelink bandwidth part of a plurality of configured sidelink bandwidth parts.

In one embodiment, the sidelink failure recovery procedure is initiated in response to a radio link quality being below a predetermined threshold for a predetermined number of instances.

In certain embodiments, determining the radio link quality comprises receiving a hybrid automatic repeat request feedback.

In some embodiments, detecting the sidelink failure based on the radio link quality comprises detecting the sidelink failure in response to the hybrid automatic repeat request feedback comprising a negative acknowledgment.

In various embodiments, initiating the sidelink failure recovery procedure comprises transmitting a sidelink failure report.

In one embodiment, the sidelink failure report comprises information indicating a candidate reference signal for beam measurement, a candidate reference signal for link measurement, a candidate beam identifier, a candidate antenna panel identifier, or some combination thereof.

In certain embodiments, a transmission parameter for transmitting the sidelink failure report is preconfigured or dynamically signaled.

In some embodiments, the transmission parameter is preconfigured via radio resource control signaling.

In various embodiments, the transmission parameter is transmitted via layer 1 signaling, layer 2 signaling, or layer 3 signaling.

In one embodiment, the transmission parameter indicates a groupcast transmission or a broadcast transmission.

In certain embodiments, the groupcast transmission or the broadcast transmission comprises a unicast link identifier that uniquely identifies a source-destination ID pair or a destination identifier.

In some embodiments, the groupcast transmission or the broadcast transmission comprises beam sweeping with different distributed antenna panels, signaling sent in a carrier frequency or bandwidth part (e.g., that improves coverage), a sidelink transmission, or some combination thereof.

In various embodiments, transmitting the sidelink failure report comprises transmitting the sidelink failure report via a sidelink medium access control control element, a physical sidelink control channel, or a discovery message.

In one embodiment, initiating the sidelink failure recovery procedure comprises receiving a sidelink failure report.

In certain embodiments, initiating the sidelink failure recovery procedure comprises transmitting an indication of the sidelink failure, transmitting information for sidelink recovery, transmitting resynchronization information, not transmitting a reception acknowledgment, transmitting a non-acknowledgment, or some combination thereof.

In some embodiments, the information for sidelink recovery comprises a candidate beam information list, a candidate reference signal, an antenna panel identifier, a destination identifier, a source identifier, a bandwidth part identifier, reference signal scheduling information, or some combination thereof.

In various embodiments, the method further comprises transmitting candidate beam related information for measurement at a predetermined time interval, wherein the measurement report is transmitted in the same carrier, the same BWP, a carrier having greater coverage, or a BWP having greater coverage.

In one embodiment, the sidelink failure detection resource set is for detection of a sidelink radio link failure, a sidelink beam failure, or a combination thereof.

In certain embodiments, the sidelink failure recovery procedure comprises a sidelink radio link failure recovery procedure, a sidelink beam failure recovery procedure, or a combination thereof.

In one embodiment, an apparatus comprises: a receiver that receives information indicating a sidelink failure detection resource set corresponding to at least one configured sidelink bandwidth part; and a processor that: determines a radio link quality of the at least one configured sidelink bandwidth part based on the sidelink failure detection resource set; detects a sidelink failure based on the radio link quality; and initiates a sidelink failure recovery procedure based on the sidelink failure.

In certain embodiments, the radio link quality indicates a radio link loss, a beam loss, or a combination thereof.

In some embodiments, the information indicates a plurality of sidelink failure detection resource sets, and each sidelink failure detection resource set of the plurality of sidelink failure detection resource sets corresponds to a unicast session.

In various embodiments, each sidelink failure detection resource set of the plurality of sidelink failure detection resources sets is for a corresponding configured sidelink bandwidth part of a plurality of configured sidelink bandwidth parts.

In one embodiment, the sidelink failure recovery procedure is initiated in response to a radio link quality being below a predetermined threshold for a predetermined number of instances.

In certain embodiments, the processor determining the radio link quality comprises the receiver receiving a hybrid automatic repeat request feedback.

In some embodiments, the processor detecting the sidelink failure based on the radio link quality comprises the processor detecting the sidelink failure in response to the hybrid automatic repeat request feedback comprising a negative acknowledgment.

In various embodiments, the apparatus further comprises a transmitter, wherein the processor initiating the sidelink failure recovery procedure comprises the transmitter transmitting a sidelink failure report.

In one embodiment, the sidelink failure report comprises information indicating a candidate reference signal for beam measurement, a candidate reference signal for link measurement, a candidate beam identifier, a candidate antenna panel identifier, or some combination thereof.

In certain embodiments, a transmission parameter for transmitting the sidelink failure report is preconfigured or dynamically signaled.

In some embodiments, the transmission parameter is preconfigured via radio resource control signaling.

In various embodiments, the transmission parameter is transmitted via layer 1 signaling, layer 2 signaling, or layer 3 signaling.

In one embodiment, the transmission parameter indicates a groupcast transmission or a broadcast transmission.

In certain embodiments, the groupcast transmission or the broadcast transmission comprises a unicast link identifier or a destination identifier.

In some embodiments, the groupcast transmission or the broadcast transmission comprises beam sweeping with different distributed antenna panels, signaling sent in a carrier frequency or bandwidth part (e.g., that improves coverage), a sidelink transmission, or some combination thereof.

In various embodiments, the transmitter transmitting the sidelink failure report comprises the transmitter transmitting the sidelink failure report via a sidelink medium access control control element, a physical sidelink control channel, or a discovery message.

In one embodiment, the processor initiating the sidelink failure recovery procedure comprises the receiver receiving a sidelink failure report.

In certain embodiments, the apparatus further comprises a transmitter, wherein the processor initiating the sidelink failure recovery procedure comprises the transmitter transmitting an indication of the sidelink failure, transmitting information for sidelink recovery, transmitting resynchronization information, not transmitting a reception acknowledgment, transmitting a non-acknowledgment, or some combination thereof.

In some embodiments, the information for sidelink recovery comprises a candidate beam information list, a candidate reference signal, an antenna panel identifier, a destination identifier, a source identifier, a bandwidth part identifier, reference signal scheduling information, or some combination thereof.

In various embodiments, the apparatus further comprises a transmitter that transmits candidate beam related information for measurement at a predetermined time interval, wherein the measurement report is transmitted in the same carrier, the same BWP, a carrier having greater coverage, or a BWP having greater coverage. Periodic measurement report for FR2 (e.g., mmWave frequency) may be transmitted in the same carrier/BWP where the measurement was performed or in a different carrier/BWP where it has better coverage, such as FR1. A measurement report may contain information to associate the report with a particular unicast link ID that uniquely identifies source-destination ID pairs, SL BWP IDs, and may be transmitted in L1, L2, or L3 signaling.

In one embodiment, the sidelink failure detection resource set is for detection of a sidelink radio link failure, a sidelink beam failure, or a combination thereof.

In certain embodiments, the sidelink failure recovery procedure comprises a sidelink radio link failure recovery procedure, a sidelink beam failure recovery procedure, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A first user equipment (UE), comprising:
at least one memory; and
at least one processor coupled with the at least one memory and configured to cause the first UE to:
establish a PC5 radio resource control (PC5-RRC) connection for sidelink unicast communication with a second UE;
transmit the sidelink unicast communication over the PC5-RRCconnection;
detect a sidelink failure for the PC5-RRC connection based at least in part on reception of a hybrid automatic repeat request (HARQ) feedback on a physical sidelink feedback channel (PSFCH);
declare the sidelink failure for the PC5-RRC connection based at least in part on detecting the sidelink failure; and
increment a value of a counter in response to the sidelink failure.

2. The first UE of claim 1, wherein the sidelink failure comprises a radio link failure for the PC5-RRC connection.

3. The first UE of claim 1, wherein the at least one processor is configured to cause the first UE to compare the value of the counter to a threshold.

4. The first UE of claim 3, wherein the at least one processor is configured to cause the first UE to, in response to the value of the counter satisfying the threshold, declare the sidelink failure.

5. The first UE of claim 1, wherein the at least one processor is configured to cause the first UE to increment a respective value of a respective counter in response to the sidelink failure for a respective PC5-RRC connection of a plurality of PC5-RRC connections, including the PC5-RRC connection.

6. The first UE of claim 1, wherein each PC5-RRC connection of a plurality of PC5-RRC connections corresponds to a separate unicast session comprising a unicast link identifier, and each PC5-RRC connection uniquely identifies a source-destination identifier (ID) pair or a destination ID.

7. A method at a first user equipment (UE), the method comprising:
establishing a PC5 radio resource control (PC5-RRC) connection for sidelink unicast communication with a second UE;
transmitting the sidelink unicast communication over the PC5-RRC connection;
detecting a sidelink failure for the PC5-RRC connection based at least in part on reception of a hybrid automatic repeat request (HARQ) feedback on a physical sidelink feedback channel (PSFCH);
declaring the sidelink failure for the PC5-RRC connection based at least in part on detecting the sidelink failure; and
incrementing a value of a counter in response to the sidelink failure.

8. The method of claim 7, wherein the sidelink failure comprises a radio link failure for the PC5-RRC connection.

9. The method of claim 7, further comprising comparing the value of the counter to a threshold.

10. The method of claim 9, further comprising, in response to the value of the counter satisfying the threshold, declaring the sidelink failure.

11. The method of claim 7, further comprising incrementing a respective value of a respective counter in response to the sidelink failure for a respective PC5-RRC connection of a plurality of PC5-RRC connections, including the PC5-RRC connection.

12. The method of claim 7, wherein each PC5-RRC connection of a plurality of PC5-RRC connection corresponds to a separate unicast session comprising a unicast link identifier, and each PC5-RRC connection uniquely identifies a source-destination identifier (ID) pair or a destination ID.

13. A first user equipment (UE), comprising:
at least one memory; and
at least one processor coupled with the at least one memory and configured to cause the first UE to:
establish a PC5 radio resource control (PC5-RRC) connection for sidelink unicast communication with a second UE;
receive the sidelink unicast communication over the PC5-RRC connection;
transmit a hybrid automatic repeat request (HARQ) feedback on a physical sidelink feedback channel (PSFCH), wherein a sidelink failure for the PC5-RRC connection is detected based at least in part on reception of the HARQ feedback by the second UE, and wherein a value of a counter is incremented in response to the second UE receiving an indication of the sidelink failure.

14. The first UE of claim 13, wherein the sidelink failure comprises a radio link failure for the PC5-RRC connection.

15. The first UE of claim 13, wherein each PC5-RRC connection of a plurality of PC5-RRC connections corresponds to a separate unicast session comprising a unicast link identifier, and each PC5-RRC connection uniquely identifies a source-destination identifier (ID) pair or a destination ID.

* * * * *